United States Patent
Smith

(10) Patent No.: US 7,845,887 B2
(45) Date of Patent: Dec. 7, 2010

(54) VEHICLE RAIL CLAMP MOUNT

(75) Inventor: Anthony Smith, Costa Mesa, CA (US)

(73) Assignee: 89908, Inc., Irvine, CA (US)

( * ) Notice: Subject to any disclaimer, the term of this patent is extended or adjusted under 35 U.S.C. 154(b) by 177 days.

(21) Appl. No.: 12/031,666

(22) Filed: Feb. 14, 2008

(65) Prior Publication Data

US 2008/0197663 A1    Aug. 21, 2008

Related U.S. Application Data

(60) Provisional application No. 60/889,916, filed on Feb. 14, 2007.

(51) Int. Cl.
*B61D 45/00* (2006.01)

(52) U.S. Cl. .................................. 410/106

(58) Field of Classification Search ............ 410/101, 410/104, 105, 106; 224/403, 405, 309, 321, 224/547, 548, 554, 281
See application file for complete search history.

(56) References Cited

U.S. PATENT DOCUMENTS

| | | |
|---|---|---|
| 4,270,681 A | 6/1981 | Ingram |
| 5,573,161 A | 11/1996 | Stapleton |
| 5,579,970 A | 12/1996 | Cucheran et al. |
| 5,893,500 A | 4/1999 | Cucheran et al. |
| 5,913,465 A | 6/1999 | Potter et al. |
| 6,059,159 A | 5/2000 | Fisher |
| 6,112,965 A | 9/2000 | Lundgren |
| 6,488,249 B1 | 12/2002 | Girardi et al. |
| 6,585,465 B1 | 7/2003 | Hammond et al. |
| 6,722,541 B1 | 4/2004 | Aftanas et al. |
| 6,789,832 B2 | 9/2004 | Gort et al. |
| 6,843,394 B2 | 1/2005 | Aki |
| 6,874,747 B2 | 4/2005 | Oh |
| 6,913,175 B2 | 7/2005 | Martin |
| 6,997,657 B1 | 2/2006 | Saward |
| 7,040,849 B2 | 5/2006 | Cunningham et al. |
| 7,175,377 B2 | 2/2007 | Womack et al. |
| 7,287,943 B1 * | 10/2007 | Saward ................. 410/104 |
| 2006/0263163 A1 | 11/2006 | Harberts et al. |
| 2008/0101883 A1 * | 5/2008 | Derecktor ............. 410/104 |
| 2009/0274531 A1 * | 11/2009 | Townson ............... 410/104 |

* cited by examiner

*Primary Examiner*—Hilary Gutman
(74) *Attorney, Agent, or Firm*—Knobbe, Martens, Olson & Bear, LLP

(57) ABSTRACT

A vehicle rail clamp mount can include a first mount portion that can be engaged with a vehicle rail at any position along the rail. The first mount portion can be positioned to overlie a vehicle rail in transverse to an axis of the rail, then rotated to a position parallel to the rail such that the first mount portion engages the rail. An interlock portion such as a tab on the first mount portion, or a second mount portion can also engage the rail or the first mount portion to prevent the first mount portion from rotating with respect to the rail. The clamp mount device can have a pin or another positioning member to maintain the position of the clamp along the rail. Various accessory mounts can be positioned on the clamp mount.

8 Claims, 10 Drawing Sheets

VEHICLE RAIL CLAMP MOUNT

CROSS-REFERENCE TO RELATED APPLICATIONS

This application is related to and claims priority to U.S. Provisional Patent Application No. 60/889,916, entitled "Vehicle Rail Clamp Mount," filed on Feb. 14, 2007.

The entirety of the above-referenced U.S. Provisional Patent Application is expressly incorporated by reference herein and made a part of the present specification.

BACKGROUND OF THE INVENTION

1. Field of the Invention

This application relates to rail clamp devices for vehicle beds.

2. Description of the Related Art

Vehicles such as pick-up trucks offer large cargo-carrying capacity in their cargo beds. Typically, to assist in the utility and versatility of the trucks, they are fitted with equipment rails. The rails are commonly mounted lengthwise along the sides of the cargo bed. Moreover, ends of the rails are typically at fixed locations such as a front end of the vehicle bed adjacent the vehicle cabin and a back end of the vehicle bed adjacent the tailgate. While these fixed locations do allow accessories to be attached to the rails, difficulty can arise because the accessory mountings can typically only be slid onto the ends of the rails. Because of the location of the rail ends, interference between the accessory mountings and the cargo bed walls can make it unwieldy or cumbersome to slide the mountings onto the rails. To slide an accessory mounting onto a rail ending near a vehicle wall, the mounting must be angled away from the wall as it is engaged, then, as the mounting moves along the rail, angled closer to the wall until it is parallel the wall during full engagement. To assist the user with this type of mounting, one or more notches can be cut in the end of the rail to permit complete engagement to necessarily occur further from the end of the rail than those rails without notches. Cutting notches can be a costly additional step in production of the rails.

Additionally, if a first accessory is rail-mounted and a second accessory is desired to occupy a location further along the rail than the first accessory, the first accessory must be removed prior to adding the second accessory, then re-mounting the first accessory.

Moreover, a typical accessory mounting includes an inner track which interfaces with the rail. Disposed within the inner track is often a guide which, while reducing friction between the accessory mounting and the rail, decreases the available tolerance within the accessory track for engaging the rail. Thus, it can likewise be difficult to mount an accessory even from the tailgate end of the rail.

Accordingly, there is a need for an accessory mounting which minimizes or eliminates interference at the end of the rail due to nearby vehicle walls. Similarly, a need exists for an accessory mounting which can eliminate the need to remove a first accessory near the end of a rail to position a second accessory further from the end than the first accessory. There is also a need for an accessory mounting which avoids the use of an inner track guide, which can make it more difficult to position mountings. Finally, a track mounting which does not require the cutting of notches in the rail can result in savings to rail manufacturers.

SUMMARY OF THE INVENTION

In various embodiments described in more detail herein, vehicle rail clamp mounts can overcome the shortcomings noted above. The vehicle rail clamp mounts described herein can also have various other features and advantages.

In certain embodiments, a vehicle rail mounting assembly is provided. The vehicle rail mounting assembly comprises a first mount portion and a second mount portion. The first mount portion is configured to overlie a vehicle rail and to removably engage the vehicle rail. The first mount portion is rotatable between a first position in which the first mount portion is removable from the vehicle rail and a second position in which the first mount portion is only movable along a rail axis of the vehicle rail. The second mount portion has an engagement position. The second mount portion is configured such that when said second mount portion is in said engagement position said first mount portion is prevented from rotating between said first position and said second position.

In certain embodiments, a vehicle rail mount is provided. The vehicle rail mount comprises a vehicle mount. The vehicle mount has a longitudinal axis, an upper surface, a lower surface, a first flange, and a second flange. The first and second flanges extend generally parallel to the longitudinal axis. The mount is positionable over a vehicle rail such that in a first position the rail extends transverse to the first flange and the second flange and the mount is removable from the rail. In a second position, the rail extends along the lower surface generally parallel to the first flange and the second flange and the mount is only movable along said rail axis.

In certain embodiments, a vehicle rail mount is provided. The vehicle rail mount comprises a mount clip. The mount clip has a rail interface surface, a mount surface opposite the rail interface surface, a first end, a second end opposite the first end, a central area between the first end and the second end, a central axis extending between the first and second ends, a first flange extending from the rail interface surface, and a second flange extending from the rail interface surface. The first flange extends from the first end of the clip towards the central area. The first flange is generally parallel to the central axis. The second flange extends from the second end of the clip towards the central area. The second flange is generally parallel to the central axis. The first flange and the second flange are configured to receive a vehicle rail therebetween extending generally parallel to the central axis. The first flange and the second flange define a transverse passage on the rail interface surface such that a vehicle rail can extend across the rail interface surface transverse to the central axis between the first flange and the second flange.

DETAILED DESCRIPTION OF THE PREFERRED EMBODIMENT

Various embodiments of accessory mounts for vehicle rail beds are discussed herein. Advantageously, the mounts can be easily applied to a vehicle bed rail at any location on the rail.

Accessory Mount Assembly

With respect to FIGS. 1-5, one embodiment of accessory mount is illustrated. As can be seen in the embodiment of accessory mount 10 illustrated in FIGS. 1-5, the accessory mount 10 can have a rail engagement clip 20 and a mounting bracket 40. The rail engagement clip 20 can couple with a vehicle rail (see, e.g., FIG. 9). As described in more detail below, the mounting bracket 40 can couple with the rail engagement clip 20 to secure an accessory to the vehicle rail.

Rail Engagement Clip

Figure 1:
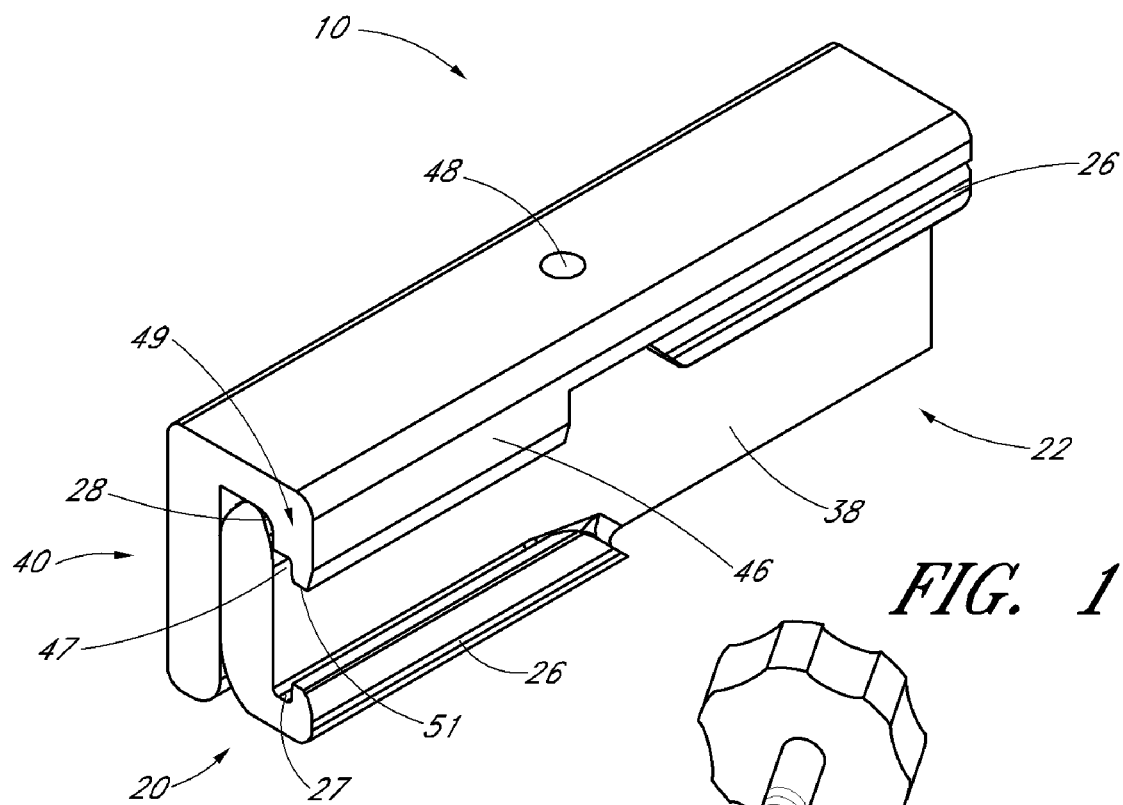
FIG. 1 illustrates a perspective view of an embodiment of an accessory mount assembly from an upper side thereof.
Figure 2:
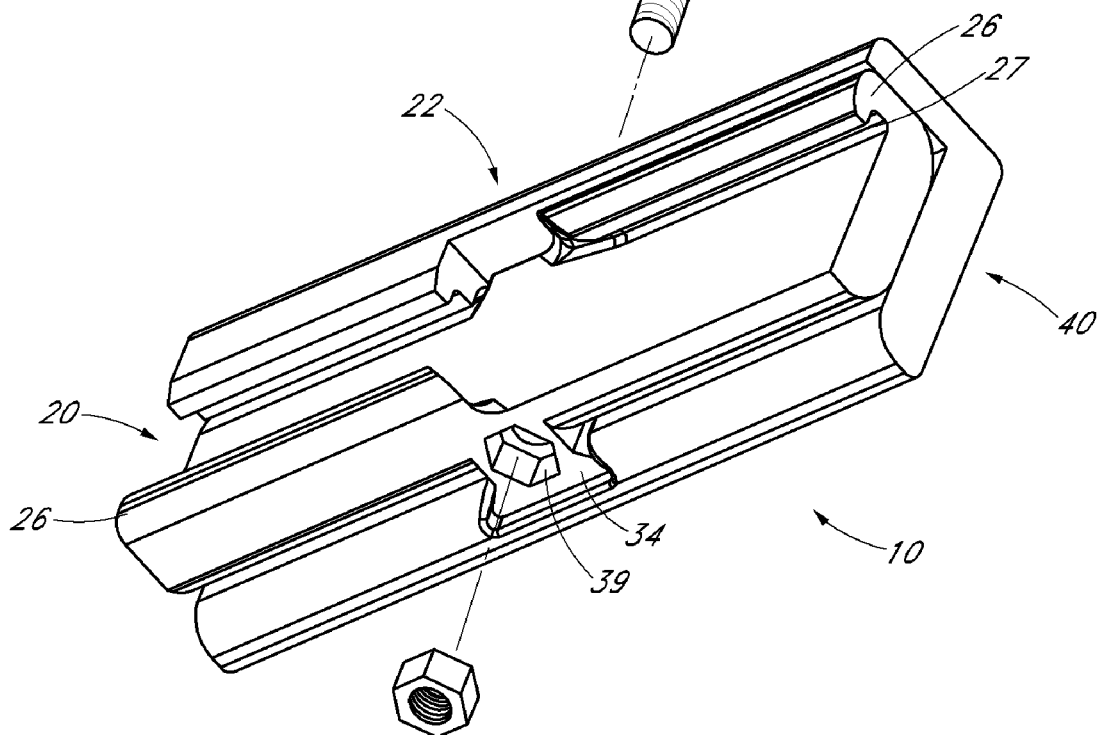
FIG. 2 illustrates a perspective view of the accessory mount assembly of FIG. 1 from a lower side thereof.

With reference to FIGS. 1 and 2, the rail engagement clip 20 can have a surface to interface with the rail, such as an engagement side 22 and a surface to interface with the mounting bracket 40, such as a mounting side 24. In some embodiments, the engagement side 22 is opposite the mounting side 24. The engagement side 22 can include at least one flange 26 extending therefrom. The flange 26 can have a hook shape, for example, comprising a flange surface extending generally transverse to the engagement side 22 and a retention surface extending generally parallel to the engagement side 22 thus forming a hook or 'L' shape. This retention surface allows the rail engagement clip 20 to be retained by a rail.

With continued reference to FIGS. 1 and 2, the rail engagement clip 20 can be configured to be selectively removable form the vehicle rail mount. For example, in some embodiments, the flanges can be configured so that the rail engagement clip 20 can be rotated between a first position in which the rail engagement clip is removable from the vehicle rail and a second position in which the rail engagement clip is engaged with the vehicle rail. In some embodiments, when the rail engagement clip 20 is in the first position, a central axis of the rail engagement clip 20 is transverse to a longitudinal axis of the vehicle rail. In the second position, a central axis of the rail engagement clip 20 is substantially parallel to the longitudinal axis of the vehicle rail.

In some embodiments, the flanges 26 can extend from diagonally opposed corners of the rail engagement clip 20. As shown in the illustrated embodiment, when a flange 26 extends from top left edge 30 of the engagement side 22 of the rail engagement clip 20 toward a central area of the rail engagement clip 20, another flange can extend from the bottom right edge 32 of the rail engagement clip 20 toward a central area. A passage can be formed in the central area such that when the rail engagement clip 20 is in the first position, the rail engagement clip is transverse to the vehicle rail.

With reference to FIG. 1, in some embodiments, a relieved portion such as a radiused edge 28 can be formed on one edge of the rail engagement clip 20 not having a flange 26. The radiused edge 28 can be disposed on any edge. The recessed or relieved portion, such as the radiused edge 28, can be adapted to receive the mounting bracket as further described below.

With reference to FIGS. 1-4, in some embodiments, the flanges 26 can have a hook shape, extending away from a rail interface surface or face 38 of the engagement side 22 of the rail engagement clip 20. The flange 26 can then curl inward, creating a channel 27. The channel 27 can be appropriately shaped to engage a standard size vehicle rail. In other embodiments, the flanges 26 of the clip 20 can be adapted create a channel 27 of varying sizes, depending on the size of the rail upon which the mounting is intended.

With continued reference to FIGS. 1-4, the flanges 26 can extend along at least a portion of the edge of the rail engagement clip 20, from one end toward central area of the clip 20 edge. The flanges 26 preferably do not extend past the central area of the clip 20 along an edge. The flanges 26 can be tapered to meet the rail interface surface or face 38 of the engagement side 22 as the flange 26 nears the center of the clip 20 on its edge. Similarly, the recessed portion, such as the radiused edge 28, can also be shaped to extend along an edge from one end of the clip 20 toward the central area of the clip 20, preferably tapered to meet the rail interface surface or face 38 of the engagement side 22 of the clip 20 as it approaches the middle of the edge.

With reference to FIGS. 1 and 2, the rail engagement clip 20 can comprise a rear protrusion 34 extending from the mounting side 24. The protrusion 34 can have a shape adapted to engage a slot 42 on the mounting bracket 40. The protrusion 34 can extend along the height of the mounting side 24 of the rail engagement clip 20. The protrusion 34 can take any appropriate shape, not limited to the one in the illustrated embodiment.

Figure 3:
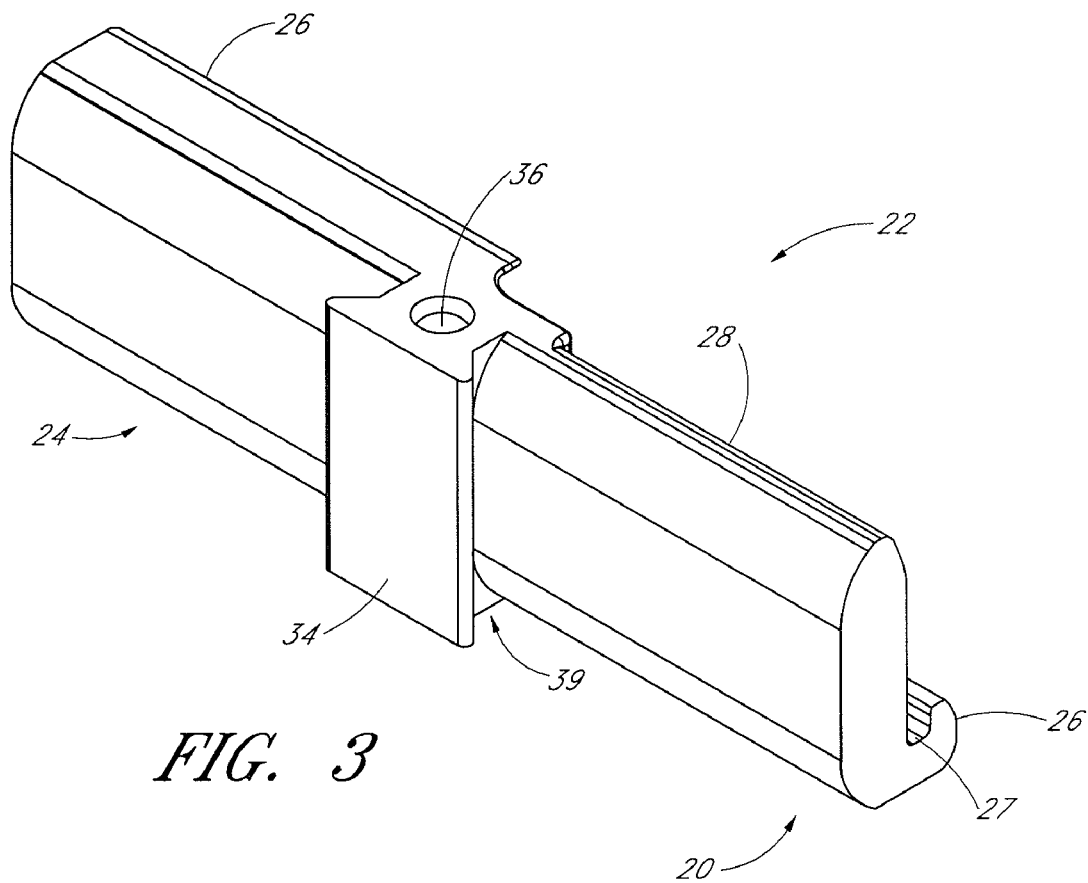
FIG. 3 illustrates a perspective view of an embodiment of a rail engagement clip of the accessory mount assembly of FIG. 1.
Figure 4:
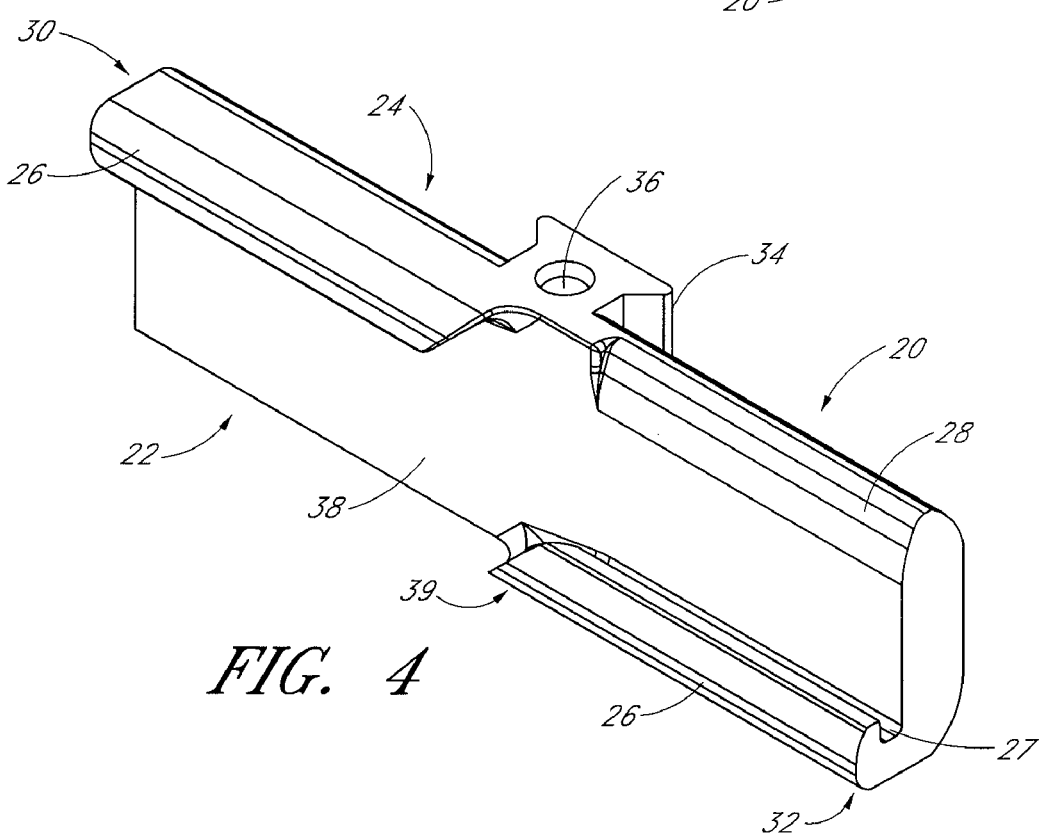
FIG. 4 illustrates another perspective view of the rail engagement clip of FIG. 3.

With reference to FIGS. 3 and 4, a socket 36 can be disposed through the protrusion 34. The socket 36 can be circular and shaped to receive a securing member such as a bolt of appropriate size. The socket 36 can have a recess at least one end, if desired. As shown in FIG. 1, in some embodiments, one side of the engagement clip 20, preferably the side without a radiused edge 28, can have a recess 39 surrounding the socket 36 shaped to receive a bolt of appropriate size. The engagement clip 20 can be constructed of a variety of materials as may be desirable for the strength and durability requirements of a particular application. For example, in various embodiments, the engagement clip 20 can be constructed from metal, plastic, a composite, or ceramic materials. As can be seen in the embodiment illustrated in FIG. 5, the mounting bracket 40 can have coupling features such as a slot 42, a mounting flange 46, and a portion of a mounting channel 47. The coupling features can allow the mounting bracket to couple to the rail mounting clip 20. In some embodiments, a relieved portion such as a radiused edge 50 can be shaped along an edge containing an opening 44 to the slot 42. Desirably, the radiused edge 50 can facilitate the coupling and decoupling of the mounting bracket 40 and the rail mounting clip 40. Along the side of the mounting bracket 40 opposite the radiused edge 50, an extension portion 51 can extend transversely away from the mounting face 52 of the mounting bracket 40. The extension portion 51 can have a substantially flat surface. An aperture 48 of similar size and shape to the socket 36 can be disposed in the extension portion.

Figure 5:
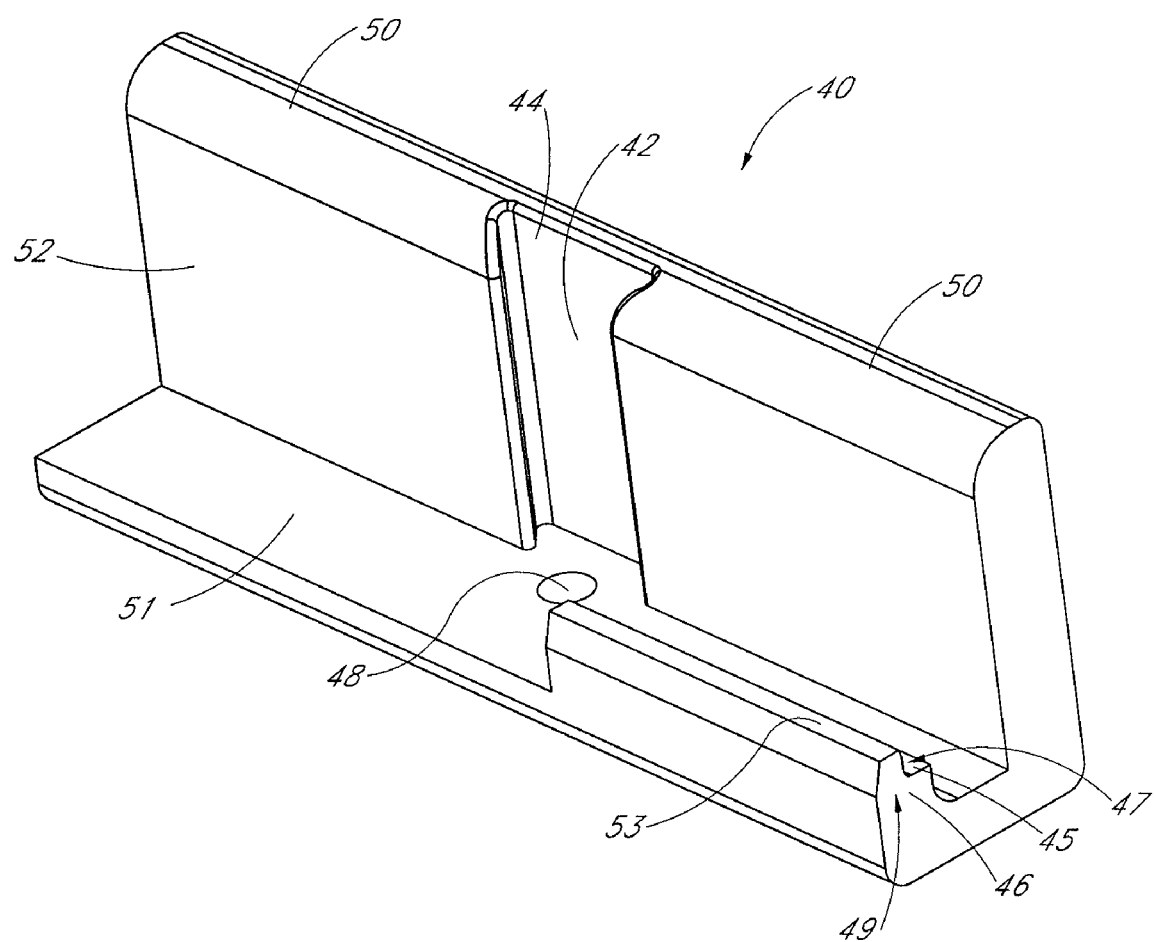
FIG. 5 illustrates a perspective view of an embodiment of a mounting bracket of the accessory mount assembly of FIG. 1.

With continued reference to FIG. 5, the extension portion 51 can include a mounting flange 46. The mounting flange 46 can extend away from the extension portion 51, and toward a longitudinal centerline of the mounting bracket 40, as illustrated in FIG. 5. In some embodiments, the mounting flange 46 can desirably include a dual-height edge 49. A portion of the edge can have a flat surface 45 at a first height, while another portion of the mounting flange 46 extends further to a define a retention portion 51 at a second height. The mounting flange 46 and dual-height edge 49 preferably extends along an edge of the mounting bracket 40 from one end of the mounting bracket 40 towards a central portion of the edge. In the illustrated embodiment, the mounting flange 46 can form a substantially right angle with a central portion of the mounting bracket 40, as shown, or can be tapered to smoothly meet the mounting face 52 in other embodiments.

With reference to FIGS. 1 and 2, the extension portion 51 can extend sufficiently far from the mounting face 52 to retain the engagement clip 20 within the mounting flange 46. As shown in FIG. 1, one of the recessed edges 28 of the rail engagement clip 20 can be partially surrounded by the mounting flange 46 when the rail engagement clip 20 is coupled with the mounting bracket 40. When the mounting clip 20 is coupled with the mounting bracket 40, a mounting channel 47 can be formed between the engagement side 22 of the rail engagement clip, and the retention portion 51 of the mounting flange 46. The mounting channel 47 can be spaced from the channel 27 of the clip 20. As further described below, positioning the rail engagement clip 20 overlying a rail and coupling the mounting bracket 40 to the rail engagement clip 20 can create a clamping force sufficient to engage the vehicle rail.

Mounting the Accessory Mount Assembly

During operation, the rail engagement clip 20 is coupled to a rail at a chosen location along the rail by rotating the clip 20 to a first position such that the flanges 26 are positioned transverse to the rail, with the channels 27 disposed nearest the rail. After the clip 20 is positioned, the rail interface surface 38 is pressed against the vehicle rail and the clip 20 is rotated to the second position to engage the flanges 26 to the vehicle rail. In the illustrated embodiment of accessory mount assembly, the channels 27 can engage the a lip of the vehicle rail. Advantageously, this rotatable engagement sequence allows the clip 20 to be mounted at any location along the rail. Thus, if another accessory mount is already present along the rail, it would not need to be removed to allow mounting of the rail engagement clip 20 along the rail.

After the clip 20 is coupled to the rail, the mounting bracket 40 can be coupled to the clip 20. The bracket 40 can be positioned such that the slot 42 is aligned with the protrusion 34 of the clip 20. In such a position, the mounting flange 46 can be disposed to couple with a radiused edge 28 of the clip 20. After the bracket 40 is positioned, it can be advanced along the protrusion to engage the clip 20. A fastener such as a bolt can be inserted into the hole 48, through the socket 36, and engage a nut in the recess 39. In other embodiments, one, some, or all of the socket 36, the hole 48, or the recess 39 can be internally threaded to retain the bolt, or another fastener. As the bolt is threadedly engaged, the mounting bracket 40 couples more securely to the rail engagement clip 20. In other embodiments, other fasteners can be used. In still other embodiments, the clip 20 and the bracket 40 can have interface features such as mating tabs and recesses, allowing them to be removably coupled.

The mounting bracket 40 can be coupled with or integrally formed with an accessory, such as, for example, a tie-down ring, a hook, or another vehicle bed accessory. Accordingly, the accessory can be easily positioned on and secured to an unused location on a vehicle rail.

Desirably, the illustrated accessory mount assembly also facilitates removal and replacement of vehicle accessories. Because the mounting bracket 40, which can couple to or be formed with an accessory, is secured to an engagement clip 20 and not the vehicle rail, the bracket 40 to which a first accessory is attached can be removed and a mounting bracket 40 attached to a second accessory can be mounted on the engagement clip 20 without requiring the installation of a new engagement clip 20. Accordingly, different accessories can be exchanged without the need to remove the engagement clip 20. The benefit is magnified when another accessory is disposed closer to the end of the rail, removing the need to disassemble both accessories to replace one. Thus accessories can be changed easily and quickly.

Rail Engagement Assembly

Figure 6:
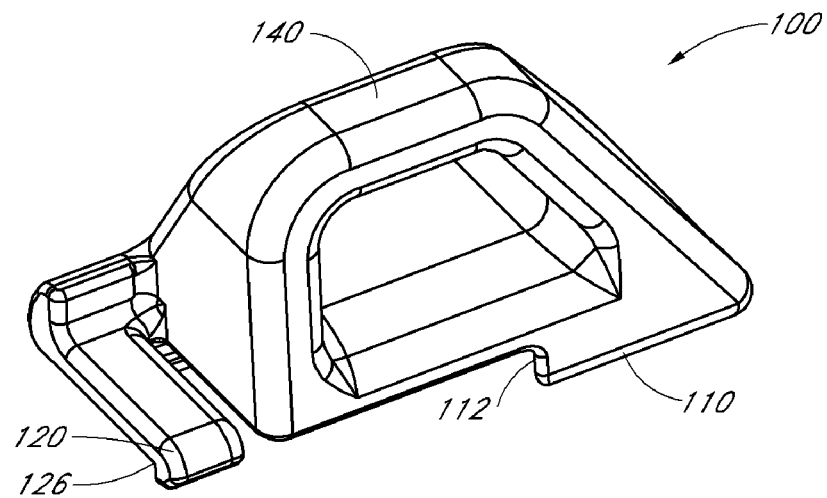
FIG. 6 illustrates a perspective view of an embodiment of a rail mounting clip from an upper side thereof.
Figure 7:
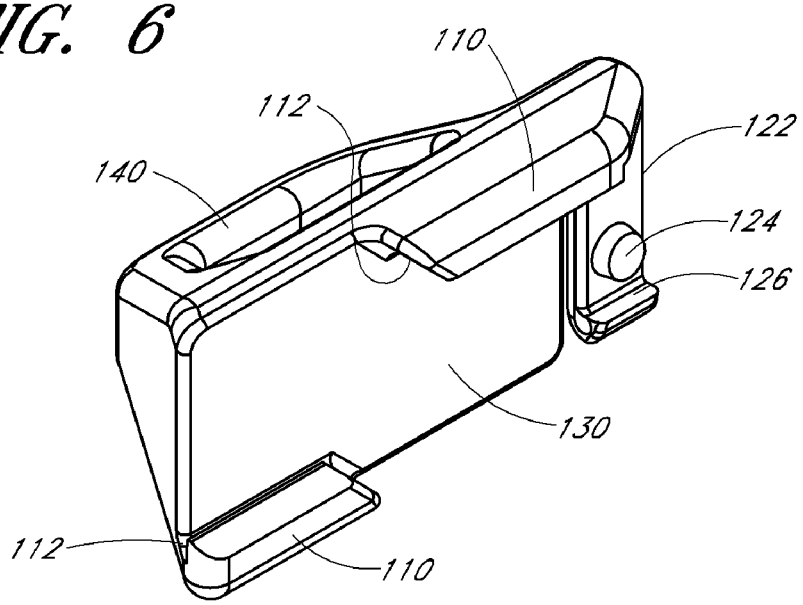
FIG. 7 illustrates a perspective view of the rail mount clip of FIG. 6 from the lower side thereof.
Figure 8:
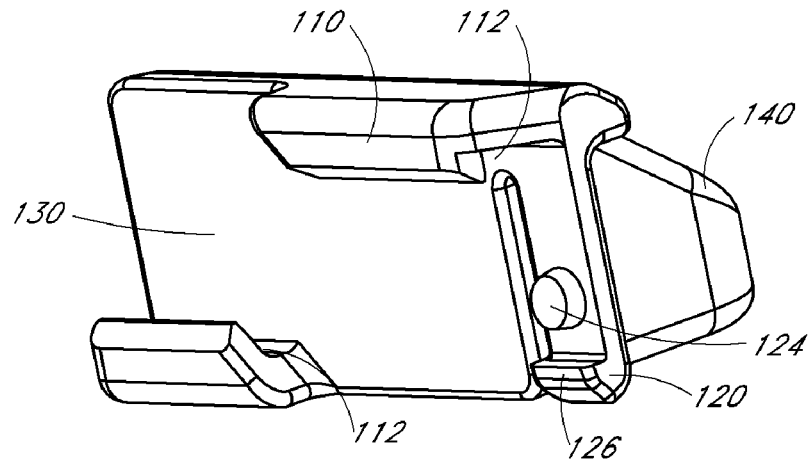
FIG. 8 illustrates a perspective view of the rail mount clip of FIG. 6 from a lower side thereof.

FIGS. 6-8 illustrate another embodiment of a rail engagement device. Several of the features and modes of operation are similar to those described with respect to other embodiments described herein, and any combination or portion of features can be used in some or any of the embodiments, not limited by the description for a particular illustrated embodiment. With reference to FIGS. 6-8, a rail mounting clip 100 can have flanges 110, a rail snap 120, and a accessory portion 140. The mounting clip 100 can be constructed from a variety of materials as may be desirable for strength and durability requirements of a particular application. For example, in various embodiments, the engagement clip 100 can be constructed from metal, plastic, ceramic, or composite materials.

With reference to FIGS. 7 and 8, the rail mounting clip 100 can have a rail interface surface 130 on one side. Extending away from the rail interface surface, the mounting clip 100 can have at least one flange 110. The flange 110 can be located on at least one edge of the face, and have an inward-extending portion to create a channel 112 of appropriate size to engage a vehicle rail (see, e.g., FIG. 9). In the illustrated embodiment, the rail mounting clip 100 comprises two flanges. In other embodiments, the rail mounting clip 100 can comprise more or fewer than two flanges. As illustrated, the flange 110 can be disposed on diagonally-opposing corners of the rail interface surface 130. The flanges 110 can be formed near a longitudinal end of the mounting clip 100 and extend along a lateral edge towards a central area of the clip 100. In some embodiments, the flanges 110 can extend from the lateral edges of the clip 100. In other embodiments, the flanges can extend from a location positioned inward from the lateral edges of the clip 100.

With reference to FIGS. 6-8, a rail snap 120 can be formed by an extension 122 connected to an edge of the clip 100. The snap 120 can have a protruding tab 126 positioned and configured to engage a vehicle rail. In some embodiments, the rail snap 120 can have a protrusion 124 extending downwardly from the extension portion 122. The protrusion 124 can have a circular shape to engage with circular holes in the vehicle rails. In other embodiments, other shapes for the protrusion 124 can also be used, or the protrusion 124 can be omitted.

The snap 120 is preferably positioned such that the tab 126 engages a vehicle rail when the rail engagement device is engaged to a vehicle rail. The rail engagement device of FIGS. 6-8 can be removably engaged to a vehicle rail by rotating the clip 100 with respect to the rail as described below. Preferably, a flange 110 located adjacent the tab 126 is spaced a sufficient distance from the snap 120 to allow the flanges 110 to engage the vehicle rail without interference from the snap 120. The snap 120 is desirably constructed to allow deflection backwards from the plane of the face 130 as the rail engagement device is engaged with and disengaged from a vehicle rail. For example, in the illustrated embodiment, the snap 120 is formed with the clip 120 such that it is connected to the clip at a lateral edge thereof, but separated from the clip 100 towards a laterally centered portion thereof. In the illustrated embodiment, the extension 122 can flex independently of a body of the clip 100. In some embodiments, the snap 120 can be integrally formed with the clip, while in other embodiments, the snap can be attached to the clip 100.

The accessory portion 140 in the illustrated embodiment is shown as a tie-down loop, but other mounting portions can also be used. For example, in some embodiments, the accessory portion 140 can comprise a handle or cleat can be formed in a rail engagement device. In another non-limiting example, the accessory portion 140 can comprise a hook. In another non-limiting example, the accessory portion 140 can be a portion of an accessory, such as, for example, a cargo basket, a utility rack, a sports equipment rack, or a bicycle carrier, allowing for simple coupling of the accessory to the vehicle rail.

During operation, the clip 100 can be rotated to a first position in which set the flanges 110 extend transverse to the vehicle rail. The rail interface surface 130 can be positioned to overlie the rail and extend through a passage formed between the flanges 110. The clip 100 can then be rotated to a second position in which the rail is substantially parallel to the flanges 110 and the rail is engaged in the channels 112 of the flanges 110. During rotation of the clip 100 from the first position to the second position, the snap 120 can be deflected away from the rail by the tab 126 passing over an upper surface of the rail. As the clip 100 is further rotated into the second position, the snap 120 can advance such that the tab 126 can extend around a portion of the vehicle rail. Once the tab 126 has extended around a portion of the vehicle rail, the extension portion 122 can rest on the surface of the rail, substantially co-planar with the rail interface surface 130 of the clip. In some embodiments, engagement of the tab 126 with the rail can produce an audible click and/or a tactile latching indication such that a user can ascertain that the clip 100 has been engaged. Once engaged, the tab 126 can prevent disengagement of the clip 100 from the second position unless desired by the operator. The protrusion 124 can be positioned in any of several indentations or holes typically present in the vehicle rail (see, e.g., FIG. 9). The clip 100 can preferably be positioned such that the protrusion 124 fills the hole, more fully engaging the clip 100 to the vehicle rail. To remove the clip 100, a user can pull the tab 126 back away from the vehicle rail, allowing the clip 100 to be rotated back to the first position such that the flanges 110 can be selectively disengaged from the rail, and the clip 100 can be withdrawn.

Vehicle Rail Mounting Assembly

With reference to FIGS. 9-16, another embodiment of vehicle rail mounting assembly is illustrated. Several of the features and modes of operation are similar to those described with respect to other embodiments described herein, and any combination or portion of features can be used in some or any of the embodiments, not limited by the description for a particular illustrated embodiment. As can be seen the illustrated embodiment, the mounting device 200 can comprise a mounting clip 210, a pin assembly 230, and a rail engagement clip 280. The engagement clip 280 can be coupled with the vehicle rail 202. The mounting clip 210 can be coupled with the engagement clip 280, and the pin assembly 230 can be used to secure the position of the mounting device 200 on the vehicle rail 202.

Figure 11:
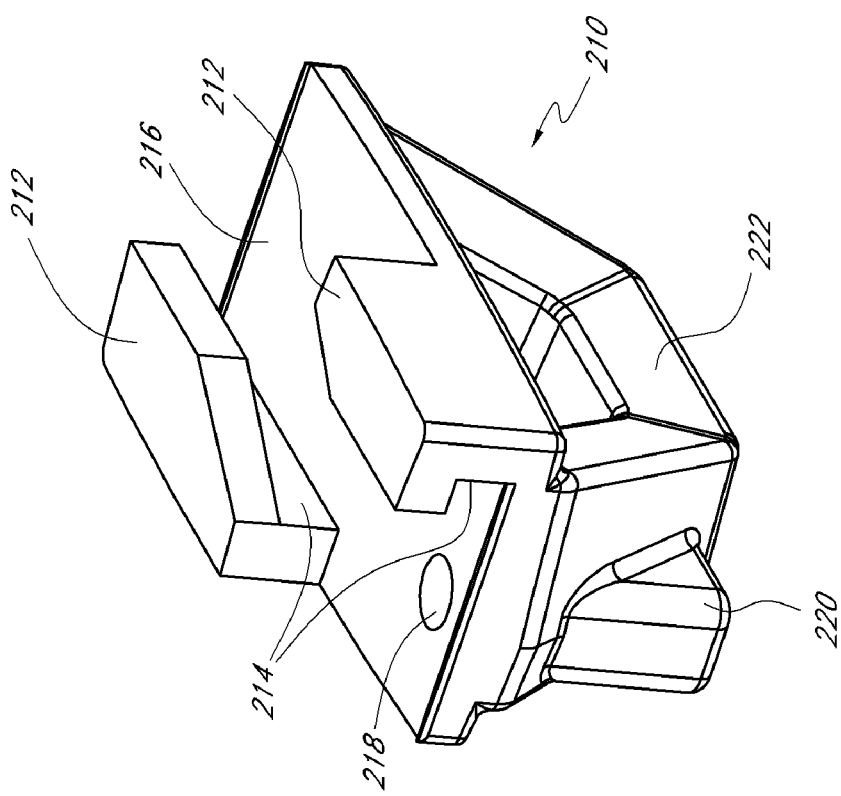
FIG. 11 illustrates a perspective view of an embodiment of the rail mounting device of FIG. 9 showing a rail interface thereof.
Figure 14:
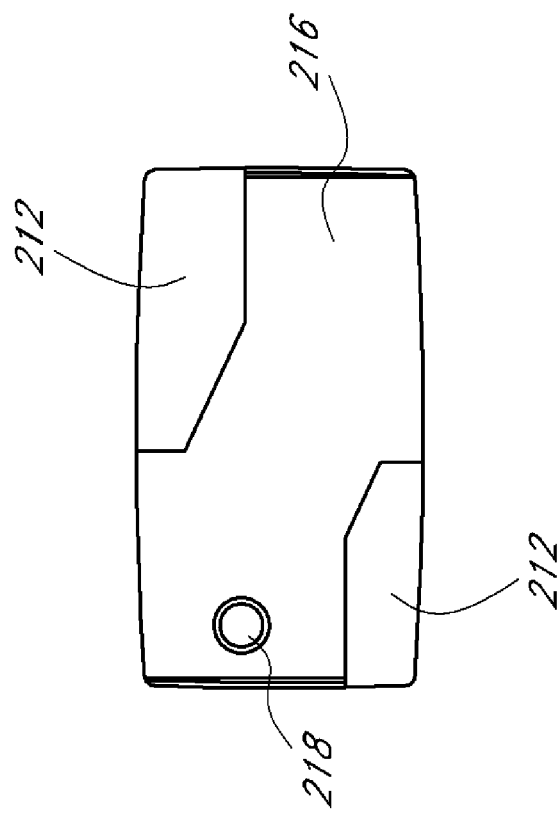
FIG. 14 illustrates a bottom view of the rail mounting device of FIG. 9.
Figure 13:
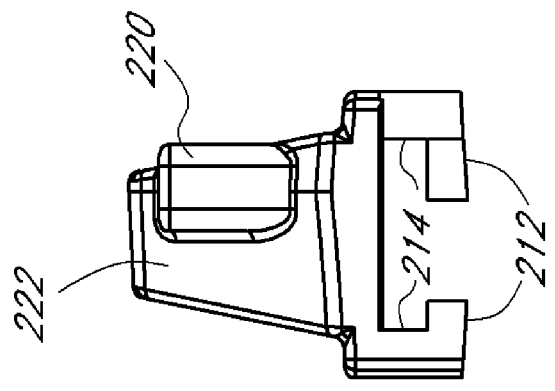
FIG. 13 illustrates a front view of the rail mounting device of FIG. 9.

With reference to FIG. 11, the mounting clip 210 can have at least one flange 212 disposed extending outward from a mounting surface 216. Although the illustrated embodiment has two flanges 212, other embodiments of mounting device can include a mounting clip having more or fewer than two flanges. Each flange 212 can have an L-shaped or hook-shaped construction, having an outer portion that turns inward towards a longitudinal centerline of the mounting clip 210 and extend a portion of the way across the surface 216 to form a channel 214 appropriately sized to couple with the engagement clip 280. The flanges 212 are preferably disposed along diagonally-opposing corners of the face 216.

Figure 10:
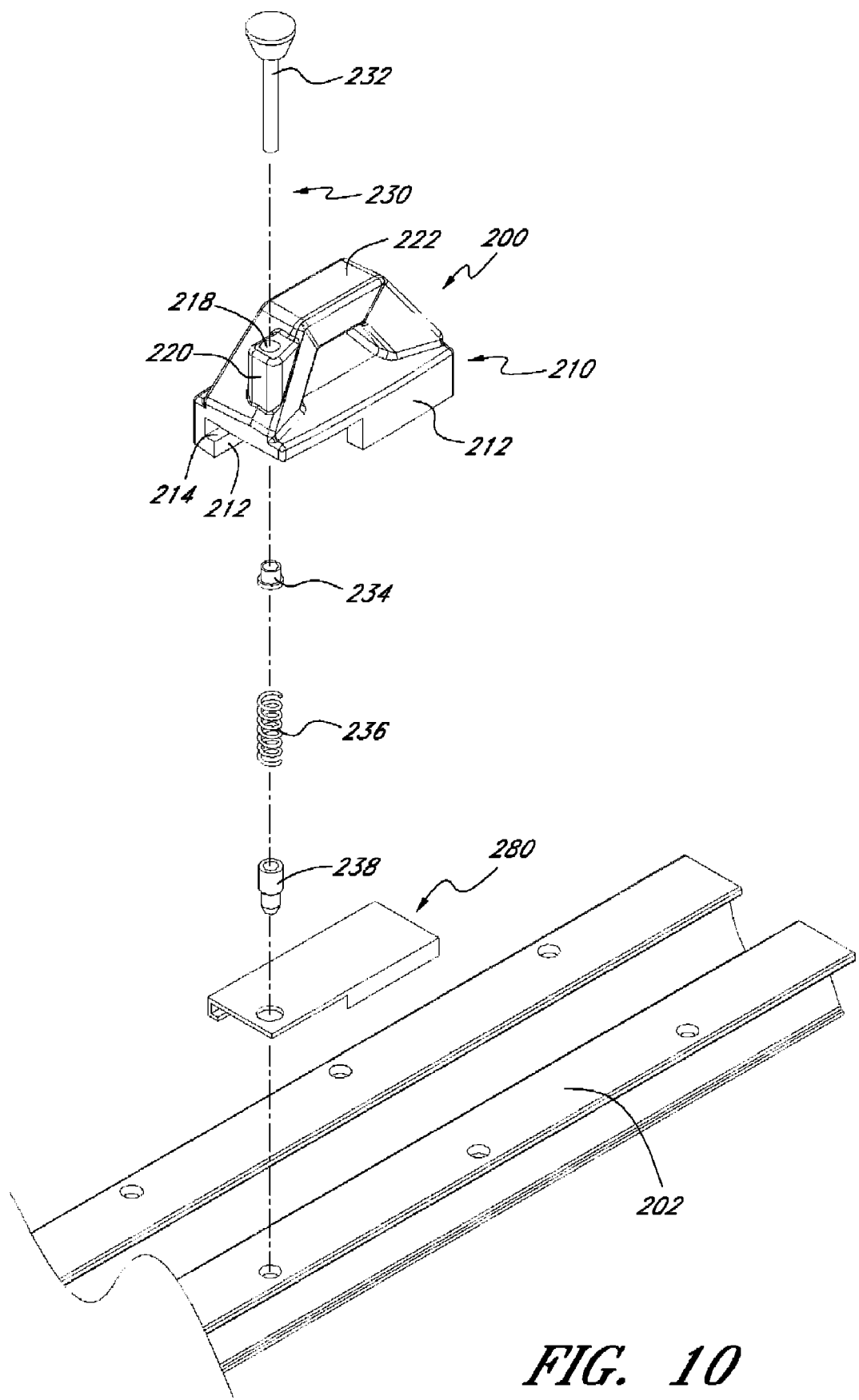
FIG. 10 illustrates an exploded view of the rail mounting device of FIG. 9.
Figure 12:
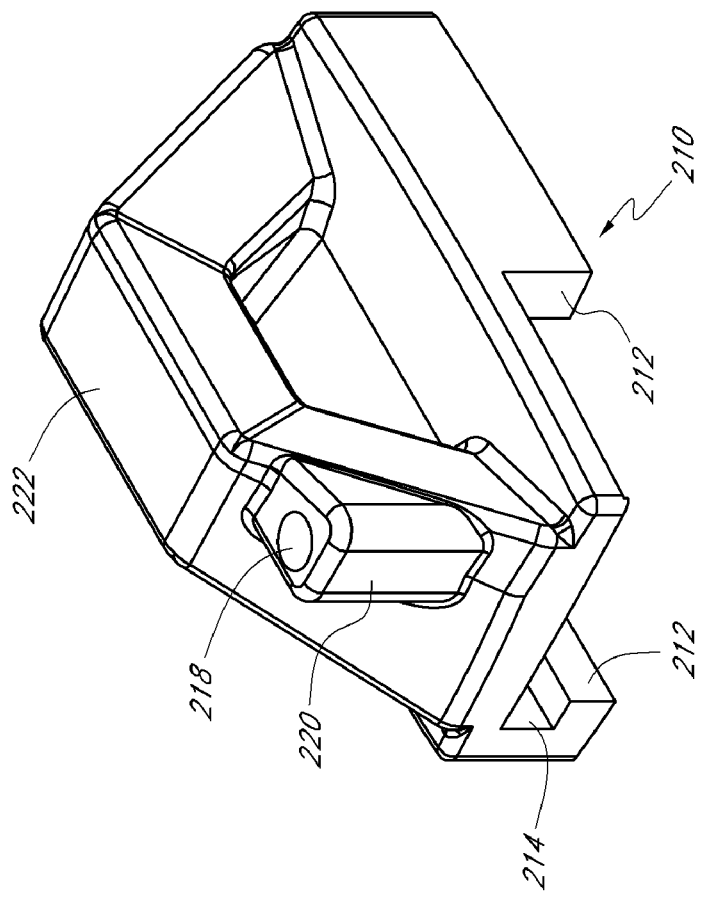
FIG. 12 illustrates a perspective view of the rail mounting device of FIG. 9 showing an accessory mount thereof.

With reference to FIGS. 10-12, the mounting surface 216 can also have a hole 218, which extends upward through the mounting clip 210 through the pin support portion 220. The hole 218 can be appropriately sized to receive the pin assembly 230.

With reference to FIGS. 9-13, the mounting clip 210 can also have an accessory portion 222. In the illustrated embodiment, the accessory portion 222 is shaped as a tie-down member, but other shapes and accessories can be formed on the mounting clip 210. For example, in some embodiments, the accessory portion 222 can comprise a hook, a cleat, a handle, or another accessory.

With reference to FIG. 10, in some embodiments, the mounting device 200 can comprise a retention mechanism such as a pin assembly 230, which can selectively maintain the position of the mounting device on the vehicle rail. The pin assembly 230 can comprise a pin 232, a collar, 234, and a spring 236. As shown in the view in FIG. 10, the pin assembly 230 can be positioned in a passage extending from the hole 218 in the mounting clip 210. The spring 236 can be disposed inside the pin support portion 220, and the pin 232 can pass through the spring 236. While a coil spring 236 is illustrated herein in the pin assembly, in other embodiments, a different biasing member, such as a compressible bushing or an elastic band can be used. The collar 234 can be positioned between the spring 236 and a ridge 238 of the pin 232, biasing the pin 232 downward towards the mounting surface 216 in a first position. As a user retracts the pin 232, the collar 236 and ridge 238 are brought closer together through compression of the spring 236. Desirably, even when the pin 232 is in a fully retracted position, the end of the pin remains inside the pin support portion 220, and the pin 232 does not protrude past the surface 216 of the mounting clip 210. Accordingly, the pin 232 can desirably be biased by the spring to extend through the surface 216 of the mounting clip 210 in an undisturbed position.

Figure 15:
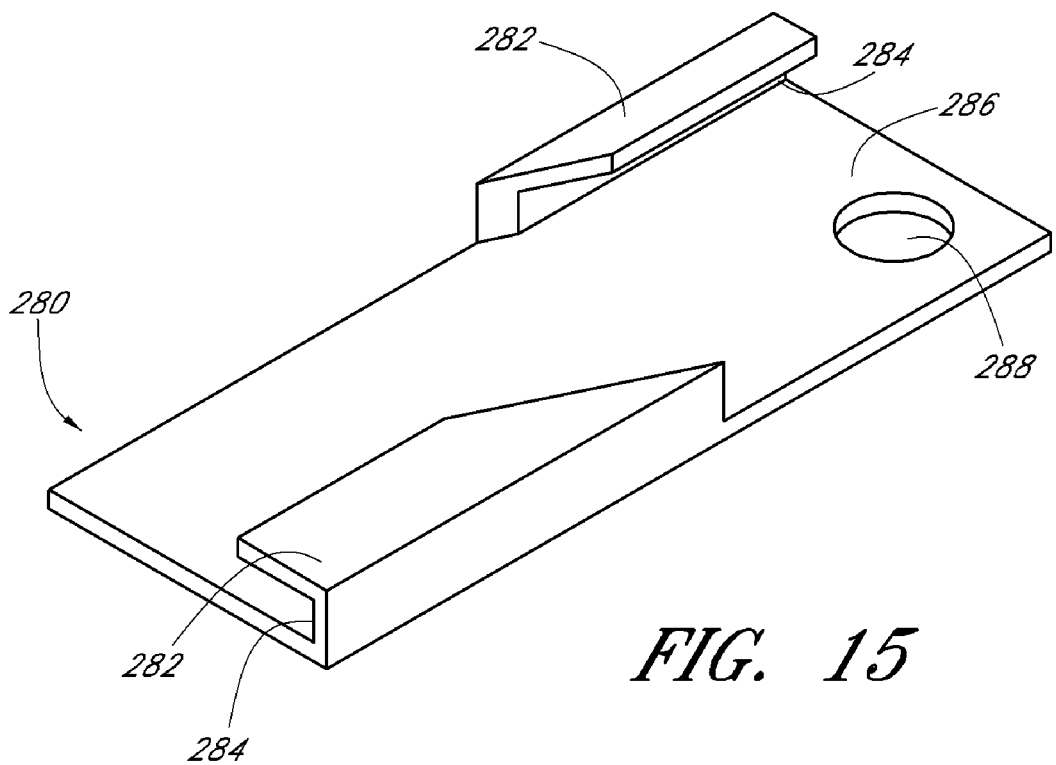
FIG. 15 illustrates a perspective view of an embodiment of a rail engagement clip for the rail mounting device of FIG. 9 showing a rail interface surface thereof.
Figure 16:
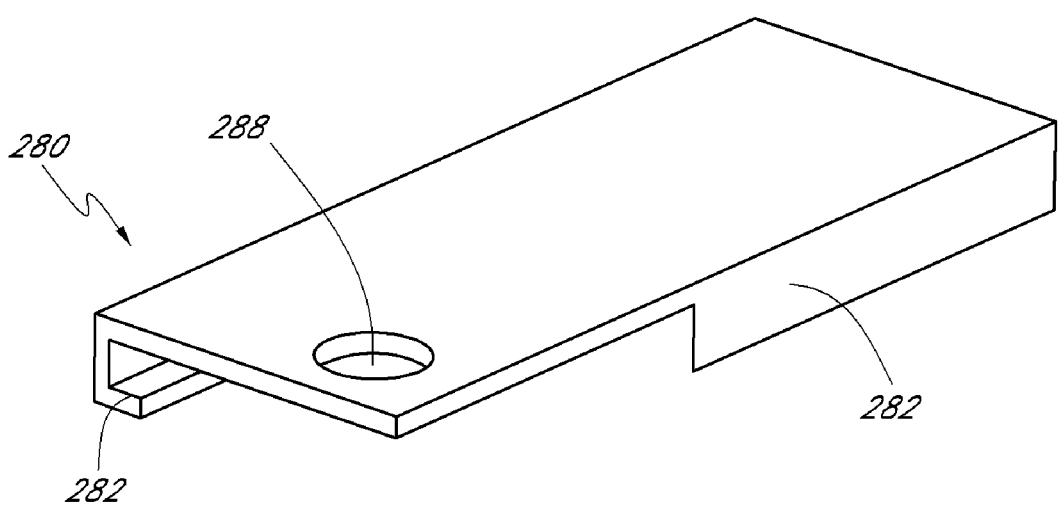
FIG. 16 illustrates a perspective view of the rail engagement clip of FIG. 15 showing an upper surface thereof.
Figure 17:
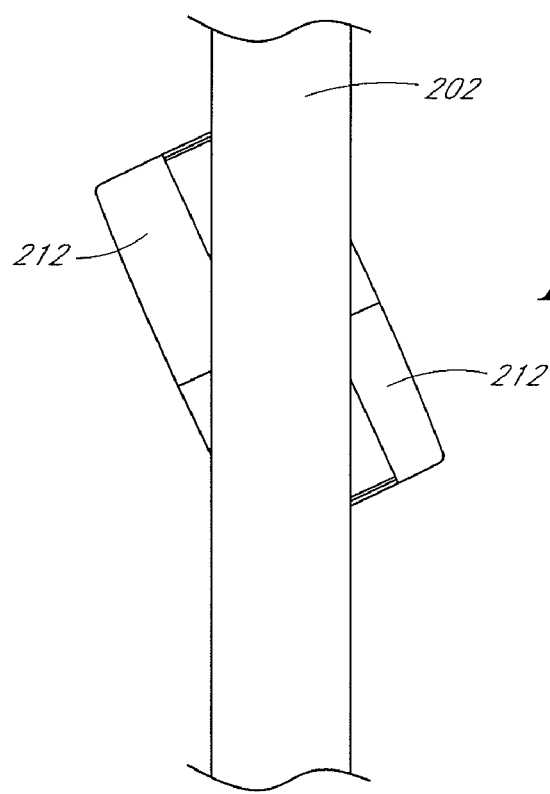
FIG. 17 illustrates a schematic bottom view of the rail mounting device of FIG. 9 in a first position relative to the vehicle rail.
Figure 18:
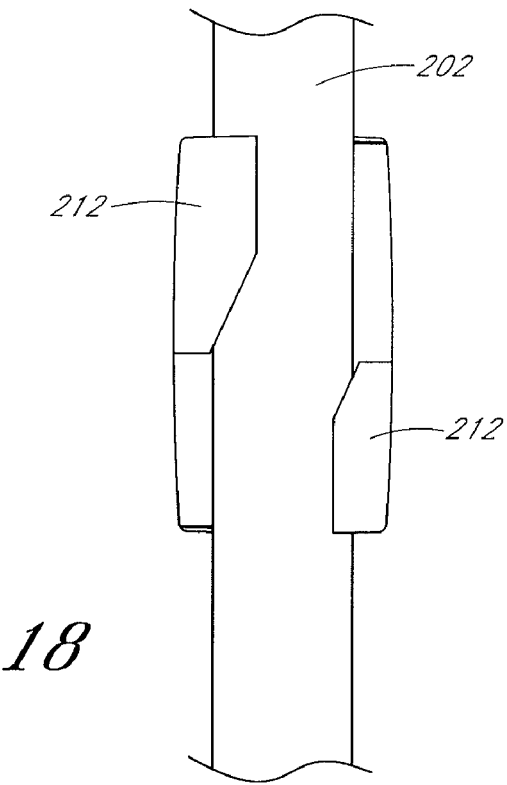
FIG. 18 illustrates a schematic bottom view of the rail mounting device of FIG. 9 in a second position relative to the vehicle rail.

FIGS. 15 and 16 illustrate a rail engagement clip 280 for the mounting device. As can be seen in FIGS. 15 and 16, the rail engagement clip 280 can have at least one flange 282 forming a channel 284 appropriately sized to couple with the rail 202. The flange 282 desirably can extend away from the engagement face 286 of the engagement clip 280 and a transverse outer portion such that the flange 282 can form a channel 284, as illustrated. In the illustrated embodiment, the engagement clip 280 comprises two flanges 282 each extending from a diagonally-opposing corner of the face 286. The clip 280 can also have a hole 288 appropriately sized to permit the pin 232 to pass through.

Figure 9:
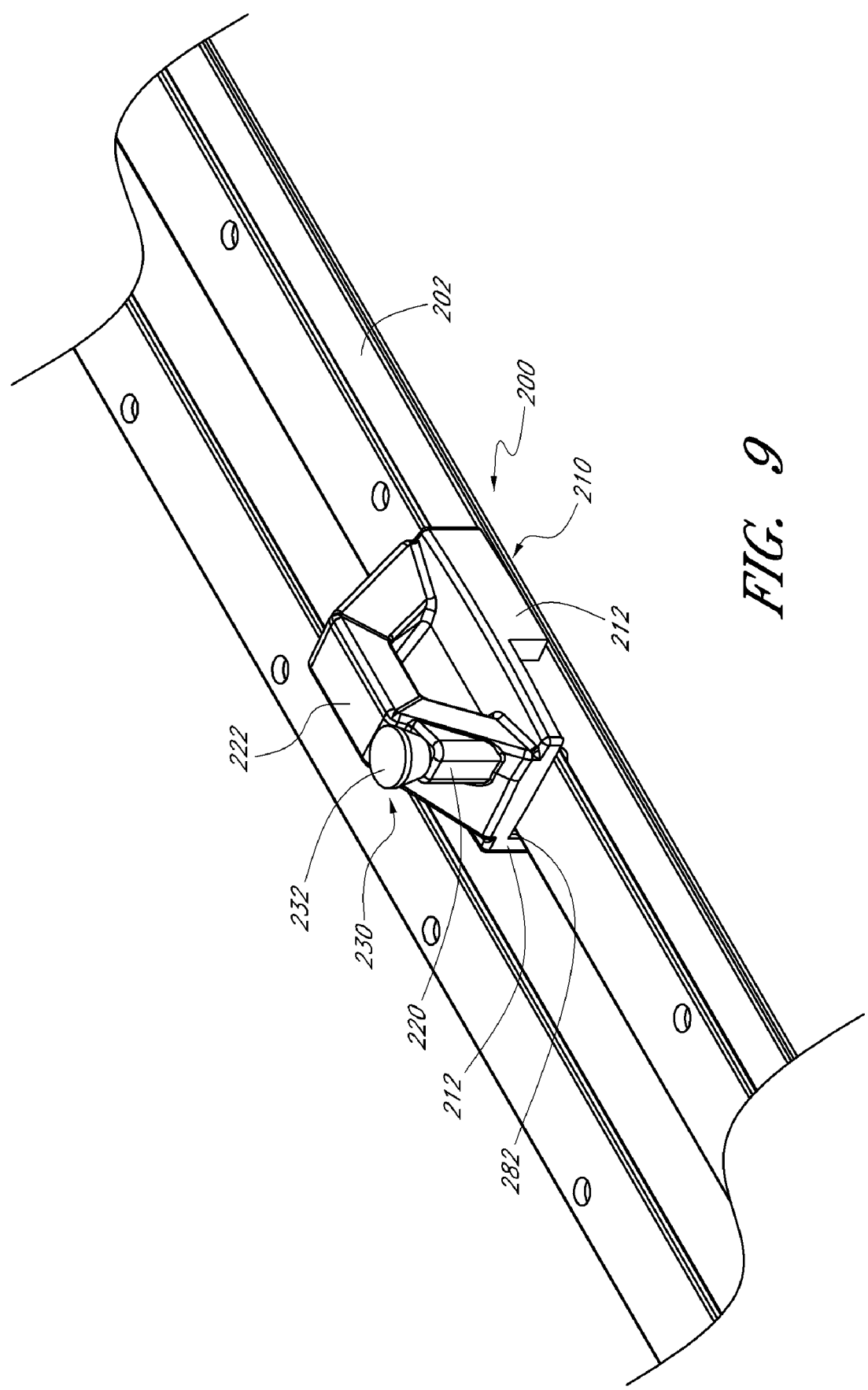
FIG. 9 illustrates a perspective view of an embodiment of a rail mounting device as mounted to a vehicle rail.

With reference to FIGS. 9 and 10, to apply the mounting device 200 to a vehicle rail, the engagement clip 280 can be positioned in a first position to overlie the rail such that the flanges 282 extend transversely to an axis of the vehicle rail and an upper surface of the vehicle rail contacts the engagement face 286 of the engagement clip 280. The engagement clip 280 can then be rotated into a second position such that the rail engagement clip 280 engages the vehicle rail 202 such that the vehicle rail 202 extends generally parallel to a longitudinal axis of the engagement clip 280, and the rail engages the channel 284 formed by the flanges 286. If desired, the engagement clip 280 can be positioned along the rail such that the hole 288 is aligned with a desired hole or recess in the rail 202.

With the engagement clip 280 in the second position, engaged with the rail 202, the rail mounting clip 210 can similarly be coupled to overlie the engagement clip 280. The mounting clip 210 can be placed in a first position where the flanges extend substantially transverse to a longitudinal axis of the rail 202, and where the mounting surface 216 contacts the engagement clip 280. The mounting clip 210 can then be rotated towards a second position where the flanges 212 extend substantially parallel to a longitudinal axis of the rail, and the engagement clip 280 and the rail 202 are positioned within channels 214 defined by the flanges 212 of the mounting clip 210. As the mounting clip 210 is rotated, the pin 232 can be pulled back, to prevent obstruction of the interface. Once the mounting clip 210 is rotated to dispose the flanges 282 in the channels 214, the pin 232 can be released to pass through the hole 288 in the engagement clip 280 and into a hole of the vehicle rail. Accordingly, the position of the mounting device 200 can be maintained through engagement of the flanges 282, 212 with the vehicle rail 202, and the pin assembly 230 extending into a hole of the vehicle rail.

As in other embodiments, advantageously, the mounting device 200 can be positioned on the vehicle rail 202 without requiring the device 200 be slid onto the end of the rail. Thus, the device 200 can be positioned inside an already-existing mounted accessory without removing the accessory. Additionally, a single engagement clip 280 can be positioned and multiple accessories having appropriate mounting clips 210 can be mounted on the engagement clip 280, allowing for interchangeable use of the space.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while the number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with, or substituted for, one another in order to perform varying modes of the disclosed invention. Thus, it is intended that the scope of the present invention herein disclosed should not be limited by the particular disclosed embodiments described above, but should be determined only by a fair reading of the claims.

What is claimed is:

1. A vehicle rail mount assembly comprising:
   a vehicle mount having a longitudinal axis, an upper surface, a lower surface, a first flange, and a second flange, the first and second flanges extending generally parallel to the longitudinal axis of the vehicle mount;
   wherein the mount is positionable over a vehicle rail having a longitudinal axis such that in a first position the longitudinal axis of the rail extends transverse to the first flange and the second flange and the mount is removable from the rail and in a second position, the rail extends along the lower surface with the longitudinal axis of the rail being generally parallel to the first flange and the second flange and the mount is only movable along said rail axis;
   wherein said mount is rotatable between said first position and said second position about an axis which is transverse to the longitudinal axis of the vehicle rail; and
   wherein the vehicle rail mount assembly further comprises an interlocking portion, which has a locking position in which said interlocking portion secures said mount against movement relative to said rail.

2. The mount assembly of claim 1, further comprising a second mount portion, wherein said second mount portion comprises said interlocking portion.

3. The mount assembly of claim 2, wherein the second mount portion comprises at least one flange.

4. The mount assembly of claim 1, further comprising said vehicle rail.

5. The mount assembly of claim 4, wherein the vehicle rail comprises a plurality of apertures that are configured to receive at least a portion of the interlocking portion.

6. The mount assembly of claim 1, wherein, when the mount is in the first position, the mount is removable from the rail in a direction that is transverse to the longitudinal axis of the rail.

7. The mount assembly of claim 6, further comprising said vehicle rail.

8. The mount assembly of claim 1, wherein the axis about which the mount rotates between said first position and said second position is generally perpendicular to both the longitudinal axis of the rail and an upper surface of the vehicle rail.

* * * * *